United States Patent
Colja et al.

(10) Patent No.: US 7,614,696 B2
(45) Date of Patent: Nov. 10, 2009

(54) LUMBAR SYSTEM FOR CLIMATE SEATING

(75) Inventors: Renato Colja, Windsor (CA); Adrian Natnail, Windsor (CA); Eric Baetens, Amherstburg (CA)

(73) Assignee: Schukra of North America, Lakeshore-Tecumseh (CA)

( * ) Notice: Subject to any disclaimer, the term of this patent is extended or adjusted under 35 U.S.C. 154(b) by 0 days.

(21) Appl. No.: 12/001,240

(22) Filed: Dec. 11, 2007

(65) Prior Publication Data

US 2008/0164738 A1 Jul. 10, 2008

Related U.S. Application Data

(60) Provisional application No. 60/869,519, filed on Dec. 11, 2006.

(51) Int. Cl.
*B60N 2/66* (2006.01)
(52) U.S. Cl. .................. 297/284.4; 297/284.7
(58) Field of Classification Search .......... 297/284.4, 297/284.7, 230.14, 284.5, 399, 400, 411.22, 297/411.25
See application file for complete search history.

(56) References Cited

U.S. PATENT DOCUMENTS

| | | | |
|---|---|---|---|
| 1,182,854 A | 5/1916 | Poler | |
| 2,756,809 A | 7/1956 | Endresen | |
| 2,812,804 A * | 11/1957 | Sandor | 297/284.5 |
| 2,843,195 A | 7/1958 | Barvaeus | |
| 2,922,416 A | 1/1960 | Fader | |
| 2,942,651 A | 6/1960 | Binding | |
| 3,378,299 A | 4/1968 | Sandor | |
| 3,490,084 A | 1/1970 | Schuster | |
| 3,492,768 A | 2/1970 | Schuster | |
| 3,724,144 A | 4/1973 | Schuster | |
| 3,762,769 A | 10/1973 | Poschl | |
| 3,880,463 A | 4/1975 | Shephard et al. | |
| 4,014,422 A | 3/1977 | Morishita | |
| 4,136,577 A | 1/1979 | Borgersen | |
| 4,153,293 A | 5/1979 | Sheldon | |
| 4,156,544 A | 5/1979 | Swenson et al. | |
| 4,159,847 A * | 7/1979 | Arai | 297/284.4 |
| 4,182,533 A | 1/1980 | Arndt et al. | |
| 4,295,681 A | 10/1981 | Gregory | |
| 4,313,637 A | 2/1982 | Barley | |
| 4,316,631 A | 2/1982 | Lenz et al. | |
| 4,354,709 A | 10/1982 | Schuster | |
| 4,390,210 A | 6/1983 | Wisniewski et al. | |

(Continued)

FOREIGN PATENT DOCUMENTS

AT 401497 9/1996

(Continued)

OTHER PUBLICATIONS

PCT International Search Report for PCT/CA2007.002250.

*Primary Examiner*—Peter R. Brown
(74) *Attorney, Agent, or Firm*—Grant D. Kang; Kang Intellectual Property Law, LLC

(57) ABSTRACT

The invention is a lumbar support basket with a sliding support structure which provides curvature and vertical travel of the apex of curvature. The basket is provided with an open area at the top half or third for receiving duct work.

4 Claims, 3 Drawing Sheets

U.S. PATENT DOCUMENTS

| | | |
|---|---|---|
| 4,449,751 A | 5/1984 | Murphy et al. |
| 4,452,485 A | 6/1984 | Schuster |
| 4,465,317 A | 8/1984 | Schwarz |
| 4,494,709 A | 1/1985 | Takada |
| 4,541,670 A | 9/1985 | Morgenstern et al. |
| 4,555,140 A | 11/1985 | Nemoto |
| 4,556,251 A | 12/1985 | Takagi |
| 4,561,606 A | 12/1985 | Sakakibara et al. |
| 4,564,235 A | 1/1986 | Hatsutta et al. |
| 4,565,406 A | 1/1986 | Suzuki |
| 4,576,410 A | 3/1986 | Hattori |
| 4,601,514 A | 7/1986 | Meiller |
| 4,602,819 A | 7/1986 | Morel |
| 4,627,661 A | 12/1986 | Ronnhult et al. |
| 4,630,865 A * | 12/1986 | Ahs ................. 297/284.4 |
| 4,632,454 A | 12/1986 | Naert |
| 4,676,550 A | 6/1987 | Neve De Mevergnies |
| 4,679,848 A | 7/1987 | Spierings |
| 4,730,871 A | 3/1988 | Sheldon |
| 4,880,271 A | 11/1989 | Graves |
| 4,909,568 A | 3/1990 | Dal Monte |
| 4,915,448 A | 4/1990 | Morgenstern |
| 4,950,032 A | 8/1990 | Nagasaka |
| 4,957,102 A | 9/1990 | Tan et al. |
| 4,968,093 A | 11/1990 | Dal Monte |
| 5,005,904 A | 4/1991 | Clemens et al. |
| 5,022,709 A | 6/1991 | Marchino |
| 5,026,116 A | 6/1991 | Dal Monte |
| 5,050,930 A | 9/1991 | Schuster et al. |
| 5,076,643 A | 12/1991 | Colasanti et al. |
| 5,088,790 A | 2/1992 | Wainwright et al. |
| 5,112,106 A | 5/1992 | Asbjornsen et al. |
| 5,137,329 A | 8/1992 | Neale |
| 5,174,526 A | 12/1992 | Kanigowski |
| 5,186,412 A | 2/1993 | Park |
| 5,197,780 A | 3/1993 | Coughlin |
| 5,215,350 A | 6/1993 | Kato |
| 5,217,278 A | 6/1993 | Harrison et al. |
| 5,286,087 A | 2/1994 | Elton |
| 5,299,851 A | 4/1994 | Lin |
| 5,335,965 A | 8/1994 | Sessini |
| 5,385,531 A | 1/1995 | Jover |
| 5,397,164 A | 3/1995 | Schuster |
| 5,423,593 A | 6/1995 | Nagashima |
| 5,449,219 A | 9/1995 | Hay et al. |
| 5,452,868 A | 9/1995 | Kanigowski |
| 5,474,358 A | 12/1995 | Maeyaert |
| 5,498,063 A | 3/1996 | Schuster et al. |
| 5,505,520 A | 4/1996 | Frusti et al. |
| 5,518,294 A | 5/1996 | Ligon, Sr. et al. |
| 5,553,917 A | 9/1996 | Adat et al. |
| 5,562,324 A | 10/1996 | Massara et al. |
| 5,567,010 A | 10/1996 | Sparks |
| 5,567,011 A | 10/1996 | Sessini |
| 5,588,703 A | 12/1996 | Itou |
| 5,609,394 A | 3/1997 | Ligon, Sr. et al. |
| 5,626,390 A | 5/1997 | Schuster et al. |
| 5,638,722 A | 6/1997 | Klingler |
| 5,651,583 A | 7/1997 | Klingler et al. |
| 5,651,584 A | 7/1997 | Chenot et al. |
| 5,704,687 A | 1/1998 | Klingler |
| 5,716,098 A | 2/1998 | Lance |
| 5,718,476 A | 2/1998 | De Pascal et al. |
| 5,722,725 A * | 3/1998 | McNaughton ............ 297/284.5 |
| 5,758,925 A | 6/1998 | Schrewe et al. |
| 5,762,397 A | 6/1998 | Venuto et al. |
| 5,769,491 A | 6/1998 | Schwarzbich |
| 5,772,281 A | 6/1998 | Massara |
| 5,775,773 A | 7/1998 | Schuster et al. |
| 5,791,733 A | 8/1998 | Van Hekken et al. |
| 5,816,653 A | 10/1998 | Benson |
| 5,823,620 A | 10/1998 | Le Caz |
| 5,857,743 A | 1/1999 | Ligon, Sr. et al. |
| 5,868,466 A | 2/1999 | Massara et al. |
| 5,884,968 A | 3/1999 | Massara |
| 5,897,168 A | 4/1999 | Bartelt et al. |
| 5,911,477 A | 6/1999 | Mundell et al. |
| 5,913,569 A | 6/1999 | Klingler |
| 5,934,752 A | 8/1999 | Klingler |
| 5,954,399 A * | 9/1999 | Hong ..................... 297/284.4 |
| 5,975,632 A | 11/1999 | Ginat |
| 5,984,407 A | 11/1999 | Ligon, Sr. et al. |
| 5,988,745 A | 11/1999 | Deceuninck |
| 6,003,941 A | 12/1999 | Schuster, Sr. et al. |
| 6,007,151 A | 12/1999 | Benson |
| 6,030,041 A | 2/2000 | Hsiao |
| 6,036,265 A | 3/2000 | Cosentino |
| 6,045,185 A | 4/2000 | Ligon, Sr. et al. |
| 6,050,641 A | 4/2000 | Benson |
| 6,053,064 A * | 4/2000 | Gowing et al. ............ 297/284.7 |
| 6,079,783 A | 6/2000 | Schuster, Sr. et al. |
| 6,089,664 A | 7/2000 | Yoshida |
| 6,092,871 A | 7/2000 | Beaulieu |
| 6,129,419 A | 10/2000 | Neale |
| 6,139,102 A | 10/2000 | Von Möller |
| 6,152,531 A | 11/2000 | Deceuninck |
| 6,152,532 A | 11/2000 | Cosentino |
| 6,158,300 A | 12/2000 | Klingler |
| 6,227,617 B1 | 5/2001 | Von Möller |
| 6,227,618 B1 | 5/2001 | Ligon, Sr. et al. |
| 6,254,186 B1 | 7/2001 | Falzon |
| 6,254,187 B1 | 7/2001 | Schuster, Sr. et al. |
| 6,270,158 B1 | 8/2001 | Hong |
| 6,296,308 B1 | 10/2001 | Cosentino et al. |
| 6,334,651 B1 | 1/2002 | Duan et al. |
| 6,338,530 B1 | 1/2002 | Gowing |
| 6,364,414 B1 | 4/2002 | Specht |
| 6,430,801 B1 | 8/2002 | Cosentino |
| 6,520,580 B1 | 2/2003 | Hong |
| 6,536,840 B1 | 3/2003 | Schuster, Sr. et al. |
| 6,595,585 B2 * | 7/2003 | Mundell .................. 297/284.4 |
| 6,616,227 B2 | 9/2003 | Blendea et al. |
| 6,644,740 B2 | 11/2003 | Holst et al. |
| 6,652,029 B2 | 11/2003 | McMillen |
| 6,666,511 B2 | 12/2003 | Schuster et al. |
| 6,676,214 B2 | 1/2004 | McMillen et al. |
| 6,682,144 B2 | 1/2004 | Klingler |
| 6,692,074 B1 | 2/2004 | Kopetzky et al. |
| 6,883,867 B2 * | 4/2005 | Klingler .................. 297/284.4 |
| 6,908,152 B2 | 6/2005 | McMillen |
| 6,908,153 B2 | 6/2005 | Blendea |
| 7,000,986 B2 | 2/2006 | Cruz Fernandes de Pinho |
| 7,083,232 B2 * | 8/2006 | Frank ..................... 297/284.4 |
| 7,393,054 B2 * | 7/2008 | McQueen et al. ......... 297/284.4 |
| 2002/0113472 A1 * | 8/2002 | Blendea et al. .......... 297/284.4 |
| 2003/0085600 A1 | 5/2003 | Mori |

FOREIGN PATENT DOCUMENTS

| | | |
|---|---|---|
| DE | 2040794 | 7/1971 |
| DE | 2064419 | 7/1972 |
| DE | 2947472 A1 | 8/1980 |
| DE | 3616155 A1 | 11/1987 |
| DE | 3624396 A1 | 1/1988 |
| DE | 4220995 A1 | 1/1994 |
| DE | 19750116 A1 | 5/1999 |
| DE | 10005215 C1 | 9/2001 |
| DE | 20107424 U1 | 11/2001 |
| EP | 0006840 B1 | 2/1982 |
| EP | 0169293 B1 | 10/1988 |
| EP | 0296938 A1 | 12/1988 |
| EP | 0322535 A1 | 7/1989 |
| EP | 0563709 A3 | 10/1993 |
| EP | 0485483 B1 | 1/1994 |

| | | | | | | |
|---|---|---|---|---|---|---|
| EP | 0434660 | B1 | 5/1995 | GB | 849798 | 9/1960 |
| EP | 0540481 | B1 | 12/1995 | GB | 1423617 | 2/1976 |
| EP | 0662795 | B1 | 12/1996 | GB | 2013487 A | 8/1979 |
| EP | 0702522 | B1 | 3/1997 | GB | 2059497 A | 4/1981 |
| EP | 0696251 | B1 | 7/1997 | RU | 587924 | 2/1978 |
| EP | 0746219 | B1 | 11/1998 | WO | WO/00/00064 | 1/2000 |
| EP | 0797399 | B1 | 11/1998 | WO | WO 03/022626 | 3/2003 |
| EP | 0698360 | B1 | 3/2000 | WO | WO 2004/043207 A2 | 5/2004 |
| EP | 1046539 | A1 | 10/2000 | WO | WO 2004/043730 A2 | 5/2004 |
| FR | 2596334 | A1 | 10/1987 | | | |

* cited by examiner

LUMBAR SYSTEM FOR CLIMATE SEATING

CROSS-REFERENCE TO RELATED APPLICATIONS

Not Applicable.

STATEMENT REGARDING FEDERALLY SPONSORED RESEARCH

Not Applicable.

APPENDIX

Not Applicable.

BACKGROUND OF THE INVENTION

1. Field of the Invention

The present invention relates to lumbar supports in seating. Specifically, the present invention relates to lumbar supports that are adapted to integrate climate systems within vehicle seating.

2. Related Art

Climate systems within seats have been developed in the past by W.E.T. Automotive Systems and Amerigon. There is a need to integrate lumbar support systems within seating so that lumbar supports and climate systems can co-exist within a single seat.

SUMMARY OF THE INVENTION

The invention is a lumbar system that utilizes a stationary basket with an independent curvature adjustment system. The curvature adjustment system utilizes a split flange to translate linear cable movement into a variable curvature form, and moves the stationary basket outward for support.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
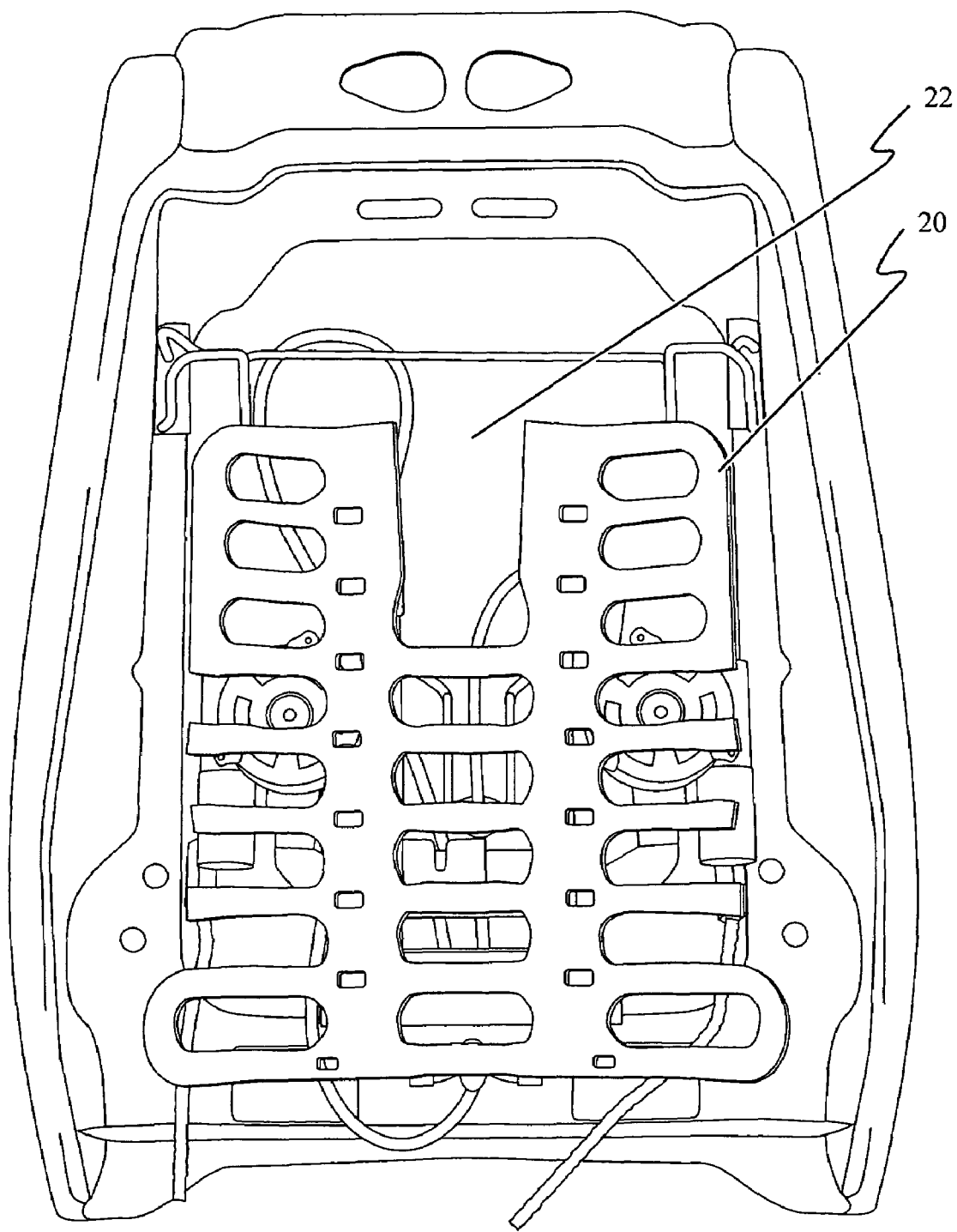
FIG. 1 is a front plan view of the system of the present invention with a basket.
Figure 2:
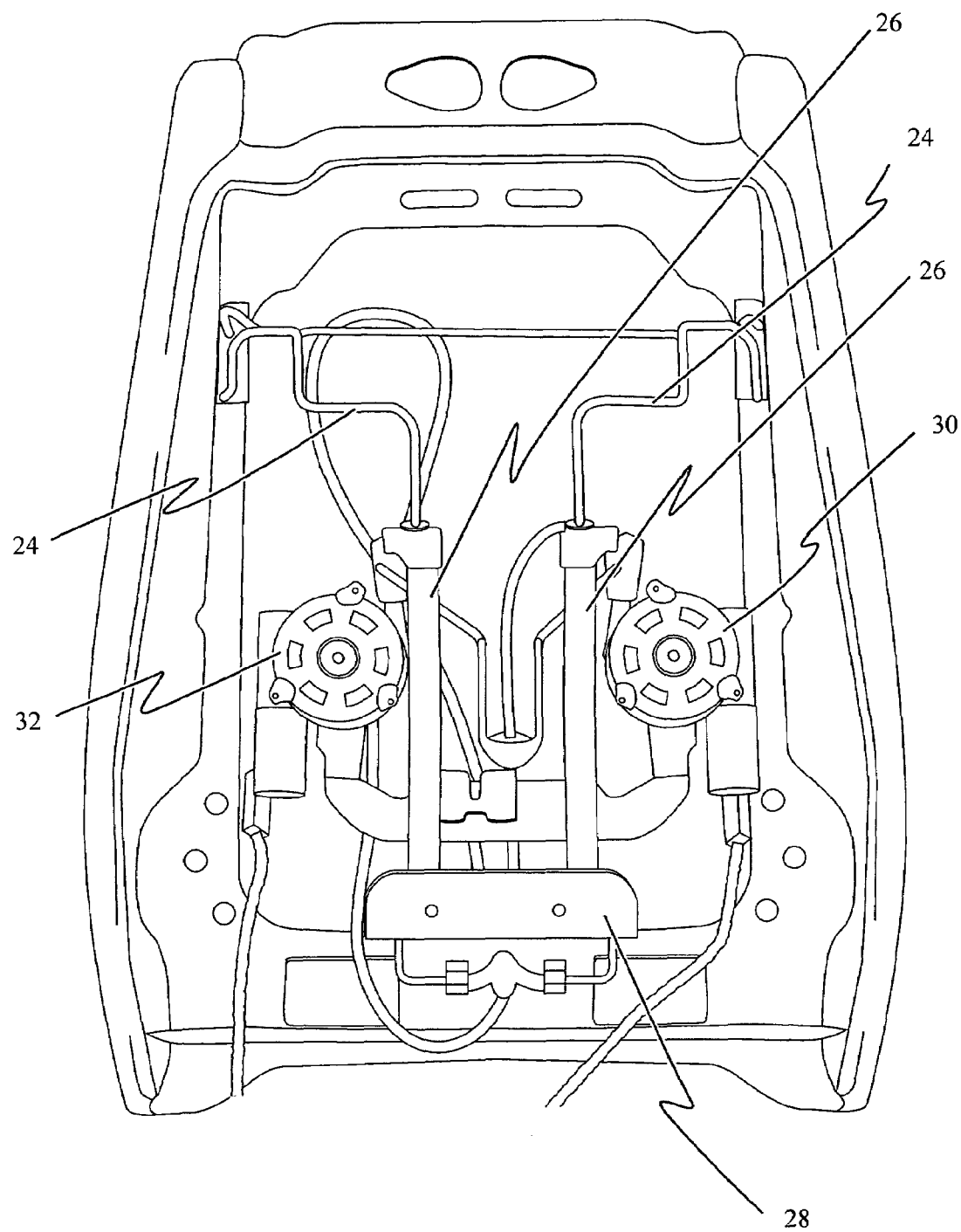
FIG. 2 is a front plan view of the system of FIG. 1, with the basket removed.
Figure 3:
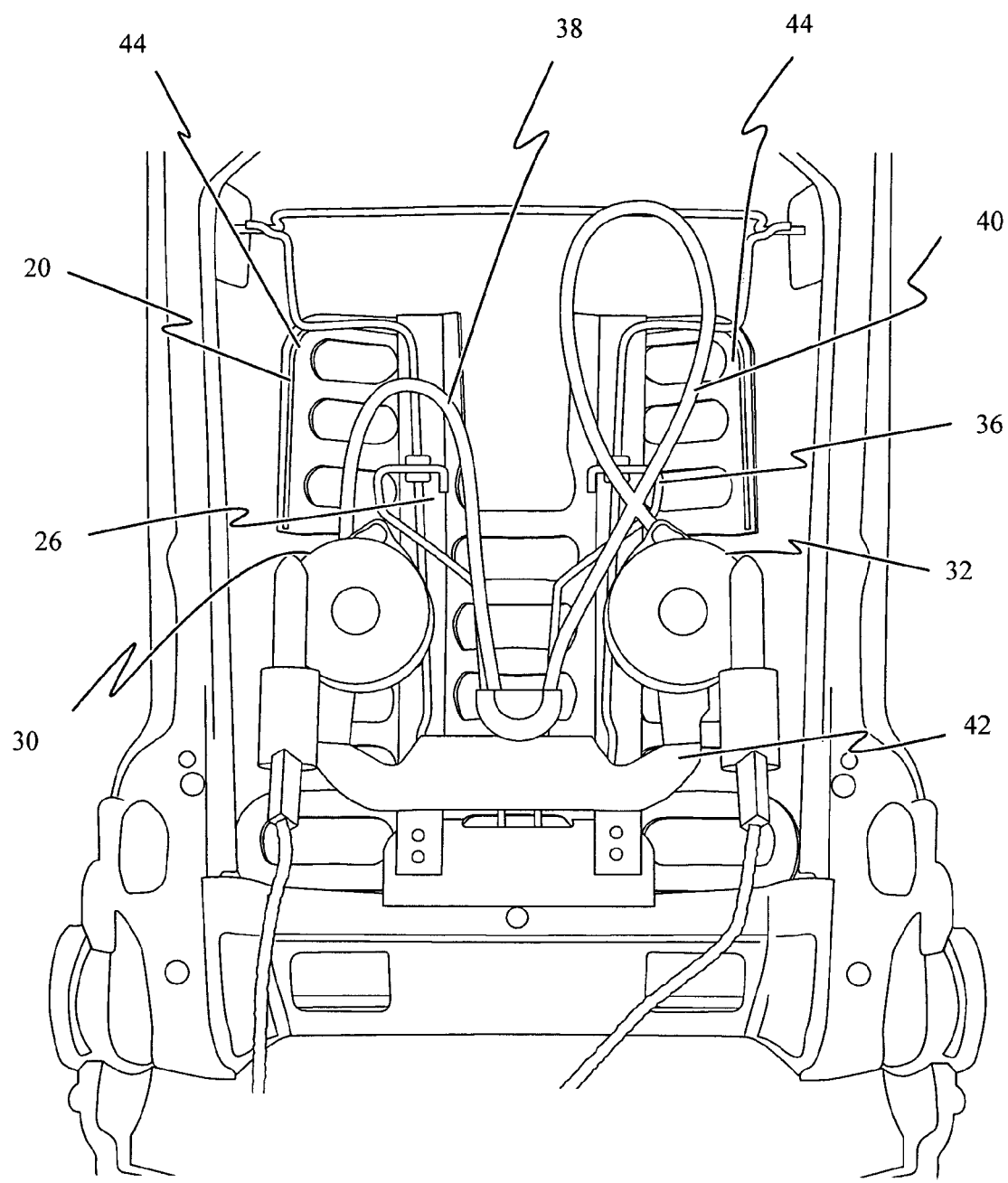
FIG. 3 is a rear plan view of the system of FIG. 1.

FIGS. 1, 2 and 3 illustrate the present invention. The only difference between FIG. 1 and FIG. 2 is that FIG. 2 has the front basket (20) removed to enable a closer component understanding. Basket (20) has an important innovation. Basket (20) differs from the prior art in that the top end of basket (20) is open. This open space (22) at the top of basket (20) may receive duct work (not shown) from a climate system. Basket (20) has a first right side and a second left side that are connected by connecting members. However, there are no connecting members that occupy or connect the top third or top half of basket (20). In other words, the connecting members occupy or connect only the bottom two-thirds or bottom half of first right side and second left side of basket (20).

As the basket (20) is adjusted, the duct work (not shown) which is stationary will have relative movement with basket (20).

FIG. 2 shows the present invention without basket (20). A metal upper flange (24) is provided for structural support and guidance of the top end of spring steel curving members (26). At the other or bottom end, spring steel curving members (26) are attached to metal lower bracket (28). There is also provided a first actuator (30) and a second actuator (32).

FIG. 3 is a rear view of the invention shown in FIG. 1. In FIG. 3, it is better seen that steel spring curving members (26) are inserted into basket (20). Also shown is Y-hanger wire (36). Y-hanger wire (36) provides an anchor point for first Bowden cable (38) associated with first actuator (30). As first actuator (30) draws first Bowden cable (38) in, because first Bowden cable (38) is anchored by Y-hanger wire (36), force is transmitted from the sleeve of first Bowden cable (38) through Y-hanger wire (36) to the top of steel spring curving members (26). The first Bowden wire (38) is connected to metal lower bracket (28). Thus a pulling force pulls one end of steel spring curving members (26) towards metal lower bracket (28). In this way, the basket (20) is curved outward for support of the body. Therefore, the operation of first actuator (30) and first Bowden cable (38) result in an in-out movement relative to a seat occupant.

The basket (20) may be translated vertically by the use of second actuator (32). Second actuator (32) is connected to second Bowden cable (40). The sleeve of second Bowden cable (40) is connected to bracket (42). The wire of second Bowden cable (40) is connected to metal lower bracket (28). When second actuator (32) draws second Bowden cable (40), metal lower bracket (28) is pulled upward. Since basket (20) is fixed at pivot (44) on metal upper flange (24), the top end of basket (20) is prevented from translating vertically. Instead, the steel spring curving members (26) and metal lower bracket (28) are translated up, with the steel spring curving members (26) sliding within and up basket (20). Thus, while the basket (20) itself does not move, the apex of curvature of basket (20) is translated vertically. Therefore, the operation of second actuator (32) and first Bowden cable (40) result in an up-down movement relative to a seat occupant.

Utilizing the present system, the apex may be adjusted vertically at least 60 millimeters, while the open area (22) for receiving a duct provides a continuously unobstructed location for climate duct work The movement of the basket (20) in and out of the seat normally changes the vertical dimension of open space (22). Because open space (22) has no bridging member between the left and right side of basket (20), any heating or cooling duct (not shown) can maintain an unobstructed air flow through open space (22).

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A lumbar support system comprising:
a basket;
a spring member slidingly connected to said basket;
a lower bracket connected to said spring member;
a Y-hanger connected to said basket;
an actuator bracket:
a first actuator connected to said actuator bracket;
a first Bowden cable connected to said first actuator, said Y-hanger, one end of said spring member, and said lower bracket such that said first actuator can move said one end of said spring member towards said lower bracket, thereby curving said spring member outward;
a second actuator connected to said actuator bracket; and
a second Bowden cable connected to said second actuator, said actuator bracket, and said lower bracket such that said second actuator can move said lower bracket relative to said actuator bracket, thereby translating said lower bracket and said spring member.

2. The lumbar support system of claim 1 further comprising a channel in said basket, wherein said spring member slides within said channel of said basket.

3. A lumbar support system comprising:
an adjustable basket, said adjustable basket comprising:
a right side;
a left side; and
a plurality of connecting members connecting said right side to said left side;
an actuator; and
a Bowden cable operatively connected to said actuator and said adjustable basket such that said actuator can adjust said adjustable basket by curving said right side and left side outward so as to provide support to a lumbar region of a seat occupant;
wherein said connecting members connect between the bottom two-thirds to the bottom one-half of the right side and the left side such that the top one-third to top one-half of said adjustable lumbar support basket is open.

4. The lumbar support system of claim 3 further comprising:
a spring member slidingly connected to said adjustable basket, said spring member having a first end and a second end; and
a bracket connected to said second end of said spring member,
wherein said Bowden cable is operatively connected to said first end of said spring member such that said activator can move said first end of said spring member towards said bracket, thereby curving said spring member outward, thereby in turn curving said right side and left side outward.

* * * * *